US007873123B2

(12) United States Patent
Wang et al.

(10) Patent No.: US 7,873,123 B2
(45) Date of Patent: Jan. 18, 2011

(54) NULL DETECTOR AND METHOD THEREOF

(75) Inventors: Chih-Chia Wang, Taichung (TW); Shu-Mei Li, Taipei (TW); Chingwo Ma, Danville, CA (US); Cen-Chieh Huang, Taipei County (TW)

(73) Assignee: Alpha Imaging Technology Corp., Hsin Chu (TW)

(*) Notice: Subject to any disclaimer, the term of this patent is extended or adjusted under 35 U.S.C. 154(b) by 724 days.

(21) Appl. No.: 11/829,978

(22) Filed: Jul. 30, 2007

(65) Prior Publication Data

US 2009/0036071 A1 Feb. 5, 2009

(51) Int. Cl.
*H04L 25/06* (2006.01)
*H04L 27/22* (2006.01)
*H04L 25/10* (2006.01)

(52) U.S. Cl. ........................ 375/317; 375/318; 375/319

(58) Field of Classification Search ................. 375/316, 375/364, 355, 260, 326; 455/127.1, 455
See application file for complete search history.

(56) References Cited

U.S. PATENT DOCUMENTS 5,991,289 A * 11/1999 Huang et al. ................ 370/350
7,319,660 B2 * 1/2008 Kim et al. .................... 370/208
2002/0057750 A1 * 5/2002 Nakao et al. ................ 375/345
2003/0193970 A1 * 10/2003 Kim et al. .................... 370/509
2004/0141573 A1 * 7/2004 Furukawa ................... 375/364
2005/0164742 A1 * 7/2005 Rajkotia ...................... 455/561
2009/0003490 A1 * 1/2009 Nadler et al. ............... 375/316

* cited by examiner

*Primary Examiner*—Chieh M Fan
*Assistant Examiner*—Qutbuddin Ghulamali
(74) *Attorney, Agent, or Firm*—Jianq Chyun IP Office

(57) ABSTRACT

A null detector and its corresponding method are provided. The null detector includes a power detector, a smoother, and an overlapper. The power detector outputs a power level signal according to the power level of a received signal. The smoother is coupled to the power detector for determining according to the power level signal whether the received signal is transmitting a null symbol, and then the smoother outputs a null detection signal at a first state value or a second state value indicating the result of the determination. The overlapper is coupled to the smoother for providing the duration and position of the null symbols transmitted by the received signal according to the null detection signal.

18 Claims, 5 Drawing Sheets

115

NULL DETECTOR AND METHOD THEREOF

BACKGROUND OF THE INVENTION

1. Field of the Invention

The present invention relates to Digital Audio Broadcasting (DAB). More particularly, the present invention relates to a null detector of a DAB receiver and a corresponding method for null detection.

2. Description of the Related Art

DAB was developed as a research project for the European Union, which started in 1987 on initiative by a consortium formed in 1986. Traditionally radio programmes were broadcast on different frequencies via FM and AM, and the radio had to be tuned into each frequency. This used up a comparatively large amount of spectrum for a relatively small number of stations, limiting listening choice. On the other hand, DAB is a digital radio broadcasting system that through the application of multiplexing and compression combines multiple audio streams onto a single broadcast frequency. Consequently DAB has some benefits over and above traditional analog systems. For example, DAB radios automatically tune to all the available stations and offering a list of all stations. DAB is more bandwidth efficient than analogue for national radio stations. In addition, the DAB standard integrates features to reduce the negative consequences of multipath fading and signal noise, which afflict existing analogue systems. DAB has been established in some countries such as the United Kingdom, Denmark, and Norway.

In a DAB system, synchronization is essential for a receiver to decode the received signal correctly. Here synchronization means locating the beginning of each transmission frame in the received signal. Theoretically the first orthogonal frequency-division multiplexing (OFDM) symbol of a transmission frame is the null symbol and during the interval of the null symbol the received signal shall be equal to zero. In an ideal environment the null symbol may be used for synchronization. However, in the real world there are always signal fading, attenuation, noises and interferences, causing sudden drops in the received signal which are likely to be considered as null symbols by naive receivers. Therefore it is impractical to treat every quiet interval as the null symbol. In other words, it is desirable to have a practical and effective solution for synchronization in a DAB system.

SUMMARY OF THE INVENTION

Accordingly, the present invention is directed to a null detector in order to provide a practical and effective solution for DAB synchronization.

The present invention is also directed to a method for null detection in order to effectively locate the beginning and duration of the transmission frames in a DAB system.

According to an embodiment of the present invention, a null detector is provided. The null detector includes a power detector, a smoother, and an overlapper. The power detector outputs a power level signal according to the power level of a received signal. The smoother is coupled to the power detector for determining according to the power level signal whether the received signal is transmitting a null symbol, and then the smoother outputs a null detection signal at a first state value or a second state value indicating the result of the determination. The overlapper is coupled to the smoother for providing the duration and position of the null symbols transmitted by the received signal according to the null detection signal.

In an embodiment of the present invention, the smoother includes at least one stage. The first stage is coupled to the power detector for receiving the power level signal. Each of the other stages is coupled to the previous stage for receiving the output of the previous stage. The last stage is coupled to the overlapper for outputting the null detection signal. In addition, each of the stages includes a calculator and a comparator. The calculator receives the input of the stage and provides a calculated signal proportional to a sum of a first predetermined number of consecutive values of the input of the stage. The comparator is coupled to the calculator for comparing the calculated signal and a first threshold value. The comparator outputs the first state value if the calculated signal is greater than the first threshold value and outputs the second state value if the calculated signal is lesser than the first threshold value. The output of the comparator is provided as the output of the stage.

In an embodiment of the present invention, the overlapper accumulates a second predetermined number of consecutive sections of the null detection signal to generate an overlap signal. All the consecutive sections of the null detection signal have the same predetermined length. The overlapper finds a crossover part of the overlap signal by comparing the overlap signal to a second threshold value, and then provides the duration and position of the null symbols transmitted by the received signal according to the crossover part.

In an embodiment of the present invention, the predetermined length of the accumulated sections is equal to the length of the longest transmission frame of the received signal multiplied by a predetermined positive integer.

In an embodiment of the present invention, the null detector is included in a receiver and the receiver further includes a time deinterleaver for reassembling the time-interleaved transmission frames of the received signal. The time deinterleaver uses a memory to store the time-interleaved transmission frames of the received signal. The null detector uses the same memory to store the overlap signal. The null detector and the time deinterleaver do not operate at the same time, thus the memory is shared by the null detector and the time deinterleaver.

According to another embodiment of the present invention, a method for null detection is provided. The method includes the following steps. First, output a power level signal according to the power level of a received signal. Determine according to the power level signal whether the received signal is transmitting a null symbol. Next, output a null detection signal at a first state value or a second state value indicating the result of the determination and then provide the duration and position of the null symbols transmitted by the received signal according to the null detection signal.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
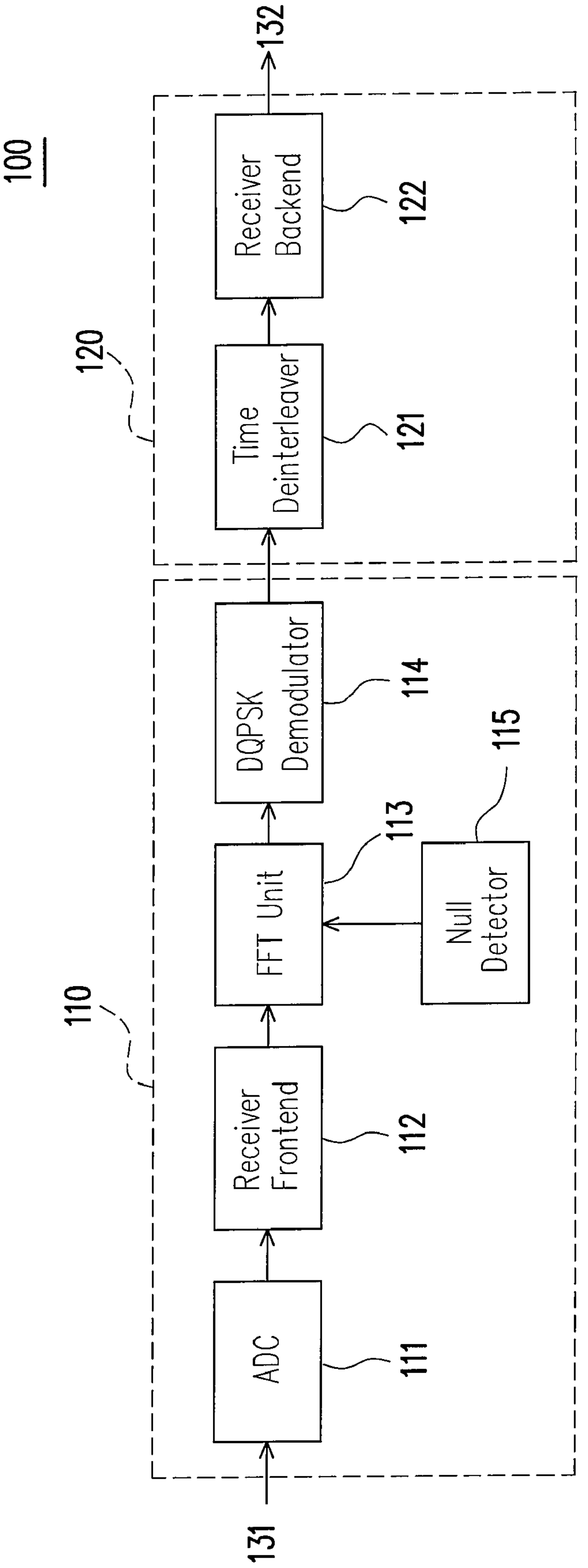
FIG. 1 is a block diagram of a DAB receiver according to an embodiment of the present invention.

Reference will now be made in detail to the present embodiments of the invention, examples of which are illustrated in the accompanying drawings. Wherever possible, the same reference numbers are used in the drawings and the description to refer to the same or like parts.

FIG. 1 is a block diagram of a DAB receiver 100 according to an embodiment of the present invention. The receiver 100 includes an inner module 110 and an outer module 120. The inner module 110 decodes the received signal 131 according to several parameters, adjusts these parameters until there is a predetermined probability (for example, 90%) that the decoding of the received signal 131 is correct, and then outputs the result of the decoding to the outer module 120. The outer module 120 is coupled to the inner module 110 to receive the result of the decoding for further processing. The inner module 110 includes an analog-to-digital converter (ADC) 111, a receiver frontend 112, a fast Fourier transform (FFT) unit 113, a differential quadrature phase-shift keying (DQPSK) demodulator 114, and a null detector 115. The outer module 120 includes a time deinterleaver 121 and a receiver backend 122.

The ADC 111 converts the received signal 131 from analog to digital form. The receiver frontend 112 is coupled to the ADC 111 and performs like a digital down converter. In other words, the receiver frontend 112 receives the output of the ADC 111, converts intermediate frequency to baseband signal, and filters off out-band signal. The null detector 115 analyzes the received signal 131 and provides synchronization information according to null symbols transmitted in the received signal 131. The FFT unit 113 is coupled to the receiver frontend 112 and the null detector 115 for performing an FFT on the output of the receiver frontend 112 according to the synchronization information provided by the null detector 115. The DQPSK demodulator 114 is coupled to the FFT unit 113 for performing a DQPSK demodulation on the output of the FFT unit 113. The time deinterleaver 121 is coupled to the DQPSK demodulator 114 for reassembling the time-interleaved transmission frames of the received signal 131. The receiver backend 122 is coupled to the time deinterleaver 121 for performing channel decoding and Moving Picture Experts Group (MPEG) 2 decoding on the output of the time deinterleaver 121, and then outputs the resultant audio/data stream 132.

As shown in Table 1 below, DAB has four transmission modes, namely, transmission modes I, II, III, and IV. The lengths of transmission frames and their null symbols are different in different transmission modes. The time unit "T" in Table 1 is 1/2048000 second. Initially the receiver 100 does not know which transmission mode is used in the received signal 131. Besides, there are many adverse effects including noises, interferences, fading, and distortion which make the null symbols hard to detect. Therefore the null detector 115 has to overcome these problems and provide effective synchronization information indicating the starting position and the length of transmission frames. In this embodiment, the synchronization information includes the duration and position of the null symbols transmitted by the received signal 131. Once the duration and position of the null symbols are known, the current transmission mode and the frame length can be deduced from the duration of the null symbols, and the positions of the null symbols are exactly the starting positions of their corresponding transmission frames.

TABLE 1 comparison among DAB transmission modes

| | Transmission mode I | Transmission mode II | Transmission mode III | Transmission mode IV |
|---|---|---|---|---|
| Transmission frame duration | 196608 T | 49152 T | 49152 T | 98304 T |
| Null symbol duration | 2656 T | 664 T | 345 T | 1328 T |

Figure 2:
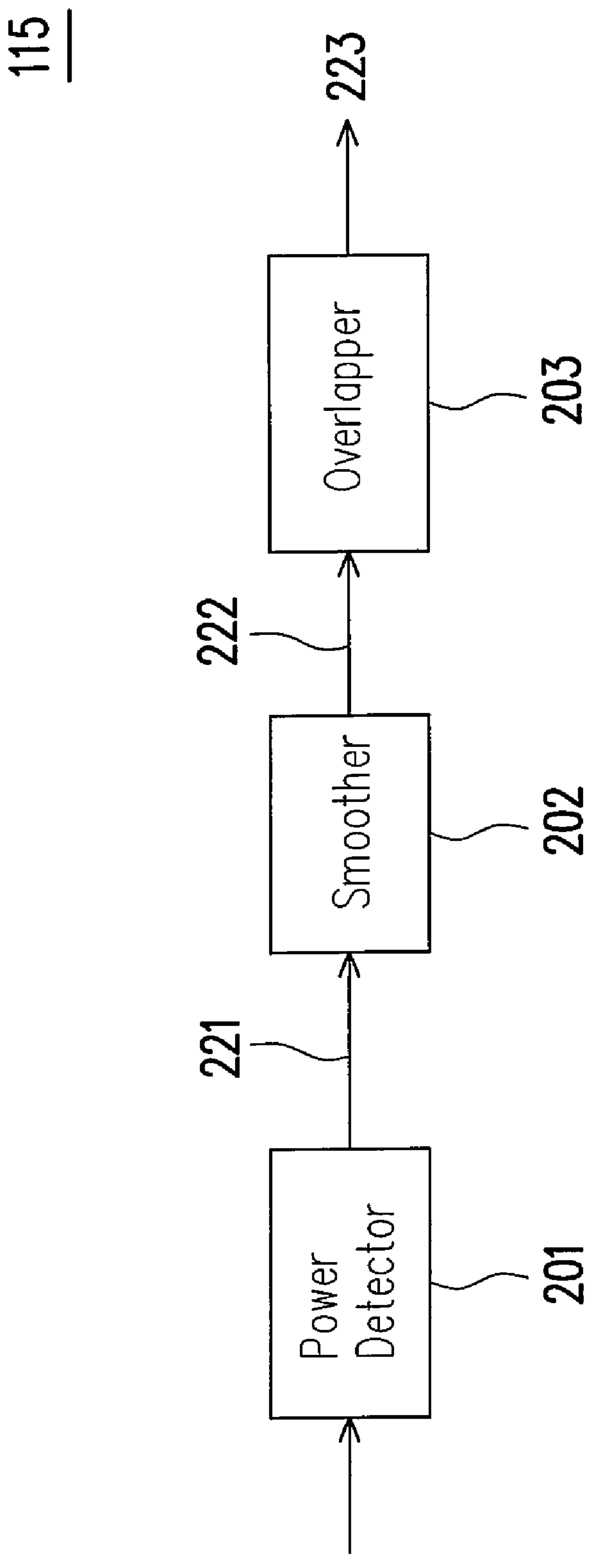
FIG. 2 is a block diagram of the null detector in FIG. 1.

FIG. 2 is a block diagram of the null detector 115 according to this embodiment. The null detector 115 includes a power detector 201, a smoother 202, and an overlapper 203. The power detector 201 outputs a power level signal 221 according to the power level of the received signal 131. In this embodiment, the power level signal 221 is directly proportional to the power level of the received signal 131. The smoother 202 is coupled to the power detector 201 for determining according to the power level signal 221 whether the received signal 131 is transmitting a null symbol. The smoother 202 outputs a null detection signal 222 at a bit value of one or zero indicating the result of the determination. The overlapper 203 is coupled to the smoother 202 for providing the synchronization information 223 including the duration and position of the null symbols transmitted by the received signal 131 according to the null detection signal 222.

Figure 3:
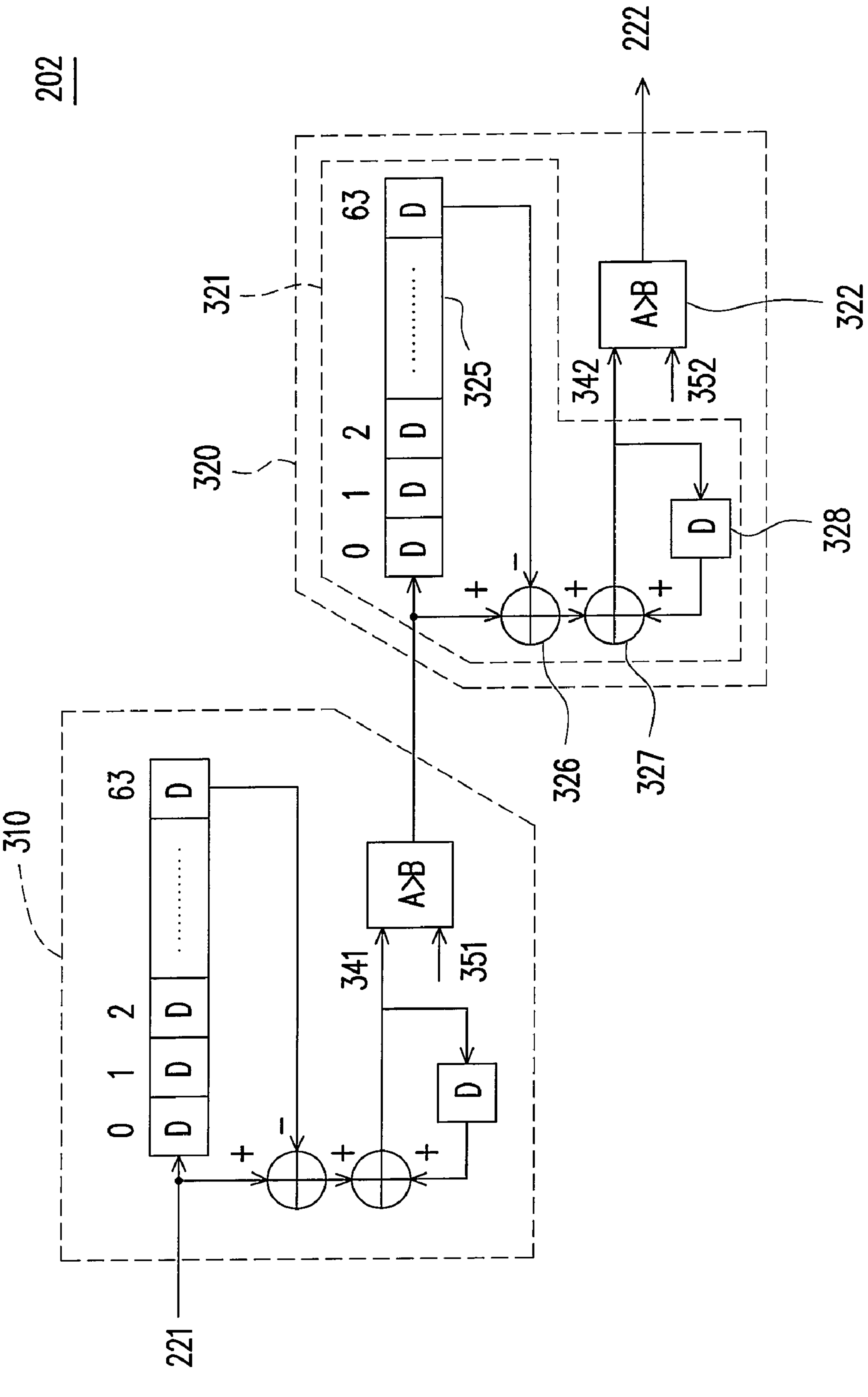
FIG. 3 is a block diagram of the smoother in FIG. 2.

FIG. 3 is a block diagram of the smoother 202 according to this embodiment. The smoother 202 includes two stages 310 and 320. The two stages in FIG. 3 is only an example. In the scope of the present invention, a smoother may consist of only one stage or many stages. The general rule is that the first stage is coupled to the power detector 201 for receiving the power level signal 221. Each of the other stages is coupled to the previous stage for receiving the output of the previous stage. The last stage is coupled to the overlapper 203 for outputting the null detection signal 222. Each stage has identical structure and function. Take the stage 320 for example. The stage 320 includes a calculator 321 and a comparator 322. The calculator 321 receives the input of the stage 320 and provides a calculated signal 342 equal to the sum of a predetermined number (64 in this embodiment) of consecutive values of the input of the stage 320. The comparator 322 is coupled to the calculator 321 for comparing the calculated signal 342 and a threshold value 352. The comparator 322 outputs one if the calculated signal 342 is greater than the threshold value 352 and outputs zero if the calculated signal 342 is lesser than the threshold value 352. The output of the comparator 322 is provided as the output of the stage 320.

The purpose of the smoother 202 is smoothing the power level signal 221 by filtering out false null symbols. Sudden short drops in the power level signal 221 caused by noises and interferences are simply averaged and mixed with adjacent higher signal levels by the calculator of a stage and then filtered out by the comparator of the same stage. On the other hand, longer drops in the power level signal 221 caused by real null symbols are kept in the output of the comparator. More stages may be concatenated for more smoothing. As a result, the output of the final stage can serve as a reliable information source for determining the duration and position of the null symbols transmitted by the received signal 131.

In this embodiment, the calculator 321 includes a queue 325, a subtractor 326, an adder 327, and a delayer 328. The queue 325 stores the 64 most recent consecutive values of the input of the stage 320. The subtractor 326 is coupled to the queue 325 for outputting the result of subtracting the earliest value stored in the queue 325 from the input of the stage 320. The delayer 328 outputs its own input after a predetermined delay period. The delay period of the delay 328 is preferably the symbol period of the received signal 131. The adder 327 is coupled to the subtractor 326 and the delayer 328 for outputting the result of adding the output of the subtractor 326 and the output of the delayer 328. The output of the adder 327 is provided as both the calculated signal 342 and the input of the delayer 328. The output of the calculator 321, namely the calculated signal 342, is the sum of the 64 most recent values of the input of the stage 320.

The overlapper 203 accumulates a predetermined number (4 in this embodiment) of consecutive sections of the null detection signal 222 to generate an overlap signal, and then the overlapper 203 finds a crossover part of the overlap signal by comparing the overlap signal and a threshold value, and then the overlapper 203 provides the duration and position of the null symbols transmitted by the received signal 131 according to the duration and position of the crossover part. In this embodiment, the crossover part is a part of the overlap signal whose level is lower than the threshold value.

The purpose of accumulating consecutive sections of the null detection signal 222 is revealing the periodic null symbols transmitted in the received signal 131 so that periodic null symbols appear as the crossover part and transient glitches are filtered out by the comparison of the overlap signal against the threshold value. Therefore all the consecutive sections of the null detection signal 222 must have the same predetermined length equal to an integral multiple of the length of the longest transmission frame of the received signal 131 so that periodic null symbols are accumulated at exactly the same position. In addition, the overlapper 203 must accumulate enough sections of the null detection signal 222 and the threshold value must be sufficiently low in order to differentiate real null symbols from false ones.

Figure 4:
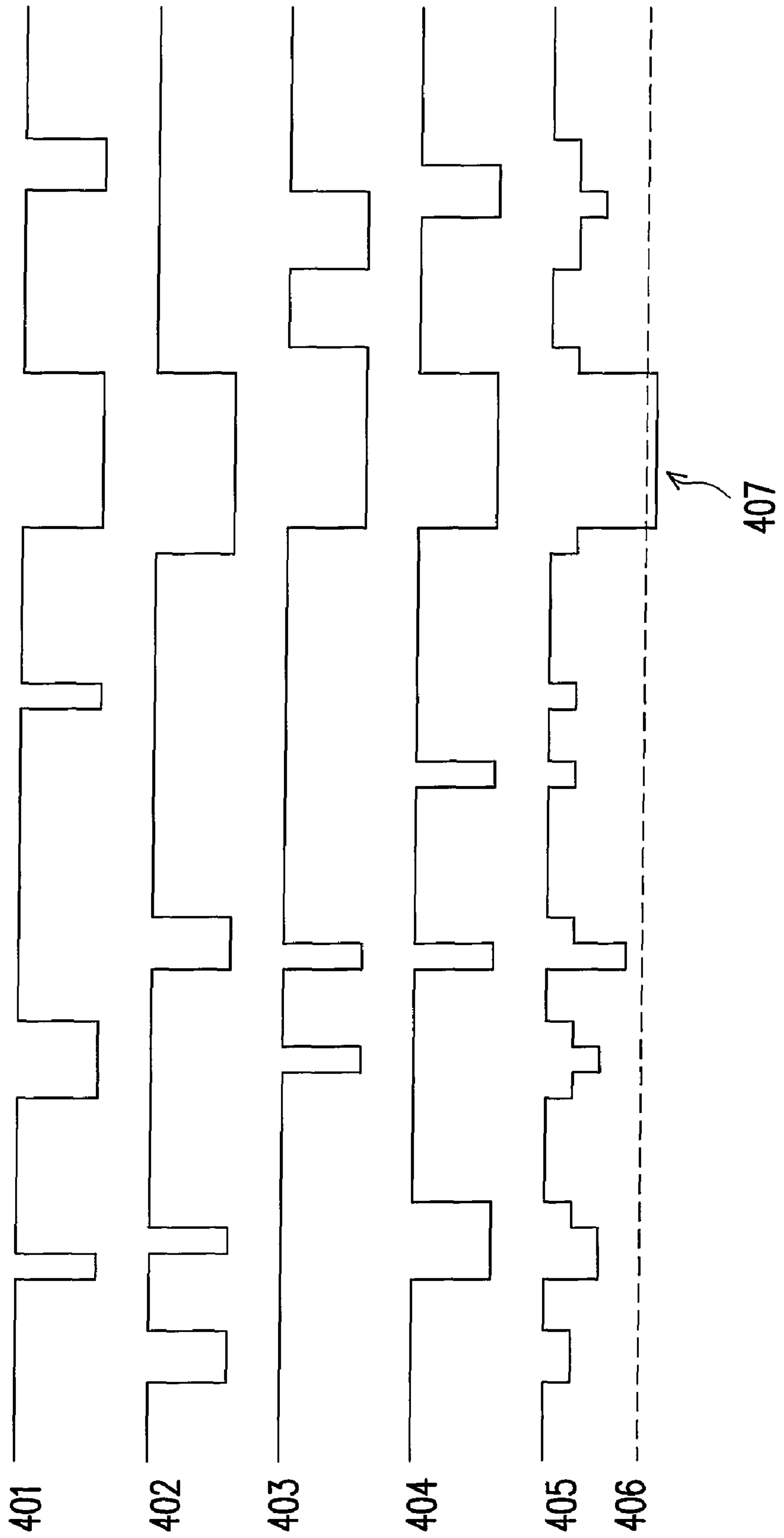
FIG. 4 is an example of the accumulation performed by the overlapper in FIG. 2.

FIG. 4 is an example of the accumulation performed by the overlapper 203 according to this embodiment. In this example, the overlapper 203 accumulates four consecutive sections 401-404 of the null detection signal 222 to generate the overlap signal 405. The length of each of the sections 401-404 is equal to a transmission frame in the transmission mode I (the longest frame). The overlapper 203 compares the overlap signal 405 against the threshold value 406 to find the crossover part 407. As shown in FIG. 4, periodic null symbols are accumulated to form the crossover part 407, while transient glitches are filtered out by the threshold value 406. Once the crossover part 407 is found, both the current transmission mode and the starting positions of the transmission frames can be deduced from the duration and position of the crossover part 407.

There are other ways to implement the null detector 115 as long as it can locate periodic null symbols in the received signal 131. For example, the power level signal 221 may be inversely proportional to the power level of the received signal 131. The calculator of each stage of the smoother 202 may provide a calculated signal equal to, directly proportional to, or inversely proportional to the sum of a predetermined number of consecutive values of the input of the stage. In the discussions above, the comparator of each stage of the smoother 202 outputs one if the calculated signal is greater than the threshold value and outputs zero if the calculated signal is lesser than the threshold value. Alternatively, the comparator of each stage of the smoother 202 may output zero if the calculated signal is greater than the threshold value and output one if the calculated signal is lesser than the threshold value. In the previous embodiment shown in FIG. 4, the null detection signal 222 indicates the possible presence of null symbols with the value zero. In other embodiments of the present invention, the null detection signal 222 may indicate the possible presence of null symbols with the value one. In such a case, the crossover part of the overlap signal becomes the part whose level is higher than the threshold value of the comparison.

Both the null detector 115 and the time deinterleaver 121 of the DAB receiver 100 need memory. The null detector 115 needs memory to store the accumulated overlap signal. The time deinterleaver 121 needs memory to store the time-interleaved transmission frames of the received signal 131 before reassembly. Memory is indispensable for the time deinterleaver 121. The memory requirement of the time deinterleaver 121 can be calculated according to the bit rate supported by the receiver 100 and the coding scheme of the received signal 131 dictated in the DAB standard. With a proper design, the memory requirement of the null detector 115 can be limited within that of the time deinterleaver 121 so that the null detector 115 may share memory with the time deinterleaver 121 and the receiver 100 needs no extra memory beside the indispensable memory required by the time deinterleaver 121, reducing the cost and complexity of the receiver 100. This is possible because the null detector 115 and the time deinterleaver 121 do not operate at the same time. As shown in FIG. 1, the null detector 115 belongs to the inner module 110 and the time deinterleaver 121 belongs to the outer module 120. Initially the null detector 115 analyzes the received signal 131 for providing synchronization information so that the inner module 110 can decode the received signal 131, while the outer module 120 does not function. After the decoding of the inner module 110 becomes sufficiently reliable, the null detector 115 ceases to function and the outer module 120 takes over the signal processing. Consequently the null detector 115 and the time deinterleaver 121 do not work at the same time and they can share a common memory.

Since the memory requirement of the null detector 115 should not exceed that of the time deinterleaver 121, a technique called saturation may be used to reduce the memory requirement of the null detector 115. The overlapper 203 accumulates sample values of consecutive sections of the null detection signal 222 to generate the overlap signal. Each sample value of the consecutive sections is accumulated in a predetermined number of bits. In the example shown in FIG. 4, the greatest possible value of the overlap signal 405 is four and the above predetermined number should be three to fully contain the greatest value. The saturation technique is reducing the predetermined number of bits allocated to each accumulated sample value. For example, the number of bits may be reduced from three to two, which is lesser than the binary length of the greatest possible accumulated sample value of the sections. In such a case, if the binary length of an accumulated sample value becomes greater than the predetermined number after accumulation, the accumulated sample value stays at the value before accumulation. In the above example, if an accumulated sample value becomes greater than three after accumulation, the accumulated sample value simply stays at three. The memory requirement of the null detector 115 is reduced by 33% due to saturation.

Figure 5:
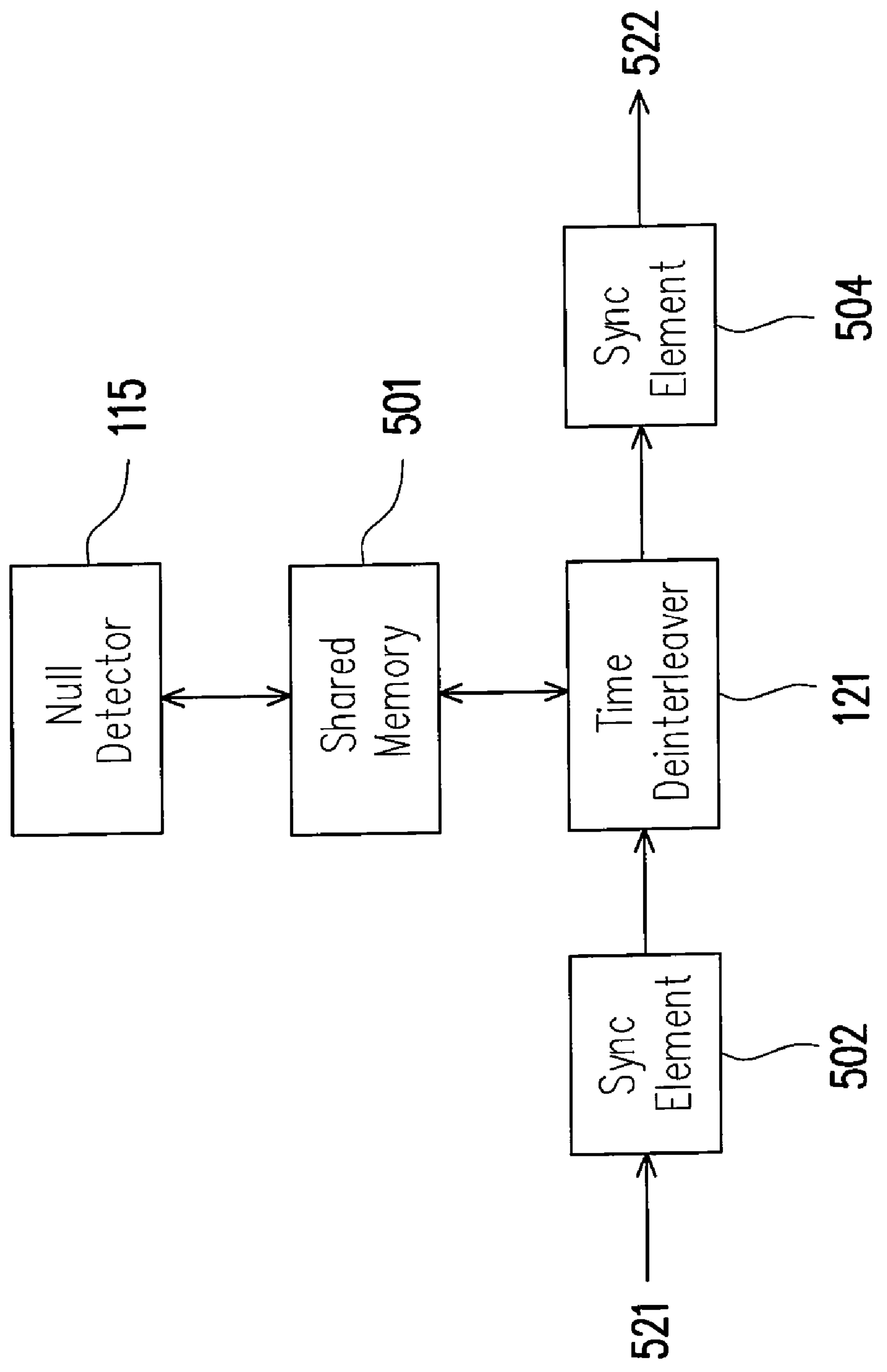
FIG. 5 is a block diagram showing the relationship among the null detector, the time deinterleaver, and the shared memory according to an embodiment of the present invention.

FIG. 5 is a block diagram showing the relationship among the null detector 115, the time deinterleaver 121, and the shared memory 501 according to an embodiment of the present invention. As shown in FIG. 5, the null detector 115 and the time deinterleaver 121 share the memory 501. According to the design philosophy and the DAB standard, it is preferable that the inner module 110 and the outer module 120 operate at different clock rates. Although the time deinterleaver 121 belongs to the outer module 120, the time deinterleaver 121 operates at the same clock frequency as that of the inner module 110 for memory sharing. In this embodiment, the inner module 110 (including the null detector 115), the time deinterleaver 121, and the memory 501 operate at 8.192 MHz, while the outer module 120 excluding the time deinterleaver 121 operates at 12.288 MHz.

Since the time deinterleaver 121 alone in the outer module 120 operates at 8.192 MHz and the rest of the outer module 120 operates at 12.288 MHz, it is important to have some mechanism to convert the input and output signals of the time deinterleaver 121 between these two clock rates. As shown in FIG. 5, the outer module 120 includes two synchronization elements 502 and 504. The synchronization element 502 is coupled to the time deinterleaver 121 for converting the input signal 521 of the time deinterleaver 121 from 12.288 MHz to 8.192 MHz and delivering the input signal 521 to the time deinterleaver 121. Similarly, the synchronization element 504 is coupled to the time deinterleaver 121 for converting the output signal 522 of the time deinterleaver 121 from 8.192 MHz to 12.288 MHz and delivering the output signal 522 from the time deinterleaver 121.

Although the shared memory 501 is shown as an independent component in FIG. 5. In some other embodiments of the present invention the share memory 501 may be included in the null detector 115 or in the time deinterleaver 121.

In addition to the null detector discussed in the previous embodiments, the present invention also includes a corresponding method for null detection. In fact, the null detector and the DAB receiver in the previous embodiments implement this method. Therefore the method is not further discussed here.

The scope of the present invention is not limited to DAB. The present invention is applicable to other communication systems as long as their transmission signal can be synchronized according to null symbols in the same way as the received signal 131 in the previous embodiments of the present invention.

In summary, the present invention provides an effective and practical solution for the synchronization problem in DAB and other similar communication systems. In addition, the memory sharing between the null detector and the time deinterleaver can help to reduce the cost and complexity of receivers in DAB and other similar communication systems.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A null detector, comprising:

a power detector for outputting a power level signal according to the power level of a received signal;

a smoother coupled to the power detector for determining according to the power level signal whether the received signal is transmitting a null symbol, the smoother outputting a null detection signal at a first state value or a second state value indicating the result of the determination; and an overlapper coupled to the smoother for providing the duration and position of the null symbols transmitted by the received signal according to the null detection signal wherein the smoother comprises a plurality of stages, the first stage is coupled to the power detector for receiving the power level signal, each of the other stages is coupled to the previous stage for receiving the output of the previous stage, the last stage is coupled to the overlapper for outputting the null detection signal, and each of the stages comprises a calculator for receiving the input of the stage and providing a calculated signal proportional to a sum of a first predetermined number of consecutive values of the input of the stage; and a comparator coupled to the calculator for comparing the calculated signal and a first threshold value, outputting the first state value if the calculated signal is greater than the first threshold value, and outputting the second state value if the calculated signal is lesser than the first threshold value, wherein the output of the comparator is provided as the output of the stage.

2. The null detector of claim 1, wherein the calculator comprises:

a queue for storing the first predetermined number of consecutive values of the input of the stage;

a subtractor coupled to the queue for outputting the result of subtracting the earliest value stored in the queue from the input of the stage;

a delayer for outputting the input of the delayer after a predetermined delay period; and an adder coupled to the subtractor and the delayer for outputting the result of adding the output of the subtractor and the output of the delayer, and for providing the output of the adder as the calculated signal and the input of the delayer.

3. The null detector of claim 1, wherein the overlapper accumulates a second predetermined number of consecutive sections of the null detection signal to generate an overlap signal, finds a crossover part of the overlap signal according to a second threshold value, and provides the duration and position of the null symbols transmitted by the received signal according to the crossover part, all the consecutive sections of the null detection signal have the same predetermined length.

4. The null detector of claim 3, wherein the overlapper finds the crossover part by comparing the overlap signal and the second threshold value, and the overlapper provides the duration and position of the null symbols according to the duration and position of the crossover part.

5. The null detector of claim 3, wherein the predetermined length of the sections is equal to the length of the longest transmission frame of the received signal multiplied by a predetermined positive integer.

6. The null detector of claim 3, wherein the null detector is included in a receiver and the receiver further includes a time deinterleaver for reassembling the time-interleaved transmission frames of the received signal, the time deinterleaver uses a memory to store the time-interleaved transmission frames of the received signal, the null detector uses the same memory to store the overlap signal, the null detector and the time deinterleaver do not operate at the same time.

7. The null detector of claim 6, wherein the size of the memory is determined by a predetermined bit rate supported by the receiver and the coding scheme of the received signal, and the size of the memory is sufficient to store the overlap signal.

8. The null detector of claim 6, wherein each sample value of the sections is accumulated in a third predetermined number of bits; the third predetermined number is lesser than the binary length of the greatest possible accumulated sample value of the sections; if the binary length of an accumulated sample value becomes greater than the third predetermined number after accumulation, the accumulated sample value stays at the value before accumulation.

9. The null detector of claim 6, wherein the receiver further comprises:

an inner module for decoding the received signal according to a plurality of parameters, adjusting the parameters until there is a predetermined probability that the decoding of the received signal is correct, and then outputting the result of the decoding; and an outer module coupled to the inner module to receive the result of the decoding for further processing; wherein the inner module comprises the null detector and the outer module comprises the time deinterleaver; the inner module, the time deinterleaver and the memory operate at a first clock rate while the outer module excluding the time deinterleaver operates at a second clock rate.

10. The null detector of claim 9, wherein the outer module further comprises:

a first synchronization element coupled to the time deinterleaver for converting an input signal of the time deinterleaver from the second clock rate to the first clock rate; and a second synchronization element coupled to the time deinterleaver for converting an output signal of the time deinterleaver from the first clock rate to the second clock rate.

11. The null detector of claim 1, wherein the power level signal is proportional to the power level of the received signal.

12. A method for null detection, comprising:

outputting a power level signal according to the power level of a received signal;

determining according to the power level signal whether the received signal is transmitting a null symbol;

outputting a null detection signal at a first state value or a second state value indicating the result of the determination; and providing the duration and position of the null symbols transmitted by the received signal according to the null detection signal, wherein the null detection signal is generated by a plurality of stages of operation, the first stage uses the power level signal as input, each of the other stages uses the output of the previous stage as input, the last stage outputs the null detection signal, and each of the stages comprises providing a calculated signal proportional to a sum of a first predetermined number of consecutive values of the input of the stage;

comparing the calculated signal and a first threshold value;

outputting the first state value as the output of the stage if the calculated signal is greater than the first threshold value; and outputting the second state value as the output of the stage if the calculated signal is lesser than the first threshold value.

13. The method of claim 12, wherein the providing of the duration and position of the null symbols comprises:

accumulating a second predetermined number of consecutive sections of the null detection signal to generate an overlap signal, wherein all the consecutive sections have the same predetermined length;

finding a crossover part of the overlap signal according to a second threshold value; and providing the duration and position of the null symbols transmitted by the received signal according to the crossover part.

14. The method of claim 13, wherein the predetermined length of the sections is equal to the length of the longest transmission frame of the received signal multiplied by a predetermined positive integer.

15. The method of claim 13, wherein the method is executed by a null detector of a receiver and the receiver further includes a time deinterleaver for reassembling the time-interleaved transmission frames of the received signal, the time deinterleaver uses a memory to store the time-interleaved transmission frames of the received signal, the null detector uses the same memory to store the overlap signal, the null detector and the time deinterleaver do not operate at the same time.

16. The method of claim 15, wherein each sample value of the sections is accumulated in a third predetermined number of bits; the third predetermined number is lesser than the binary length of the greatest possible accumulated sample value of the sections; if the binary length of an accumulated sample value becomes greater than the third predetermined number after accumulation, the accumulated sample value stays at the value before accumulation.

17. The method of claim 15, wherein the receiver further comprises:

an inner module for decoding the received signal according to a plurality of parameters, adjusting the parameters until there is a predetermined probability that the decoding of the received signal is correct, and then outputting the result of the decoding; and an outer module coupled to the inner module to receive the result of the decoding for further processing; wherein the inner module comprises the null detector and the outer module comprises the time deinterleaver; the inner module, the time deinterleaver and the memory operate at a first clock rate while the outer module excluding the time deinterleaver operates at a second clock rate.

18. The method of claim 17, further comprising:

converting an input signal of the time deinterleaver from the second clock rate to the first clock rate; and converting an output signal of the time deinterleaver from the first clock rate to the second clock rate.

* * * * *